3,293,507
ELECTROLYTIC DEVICE COMPRISING A SEALED-CONTAINER COMBINATION

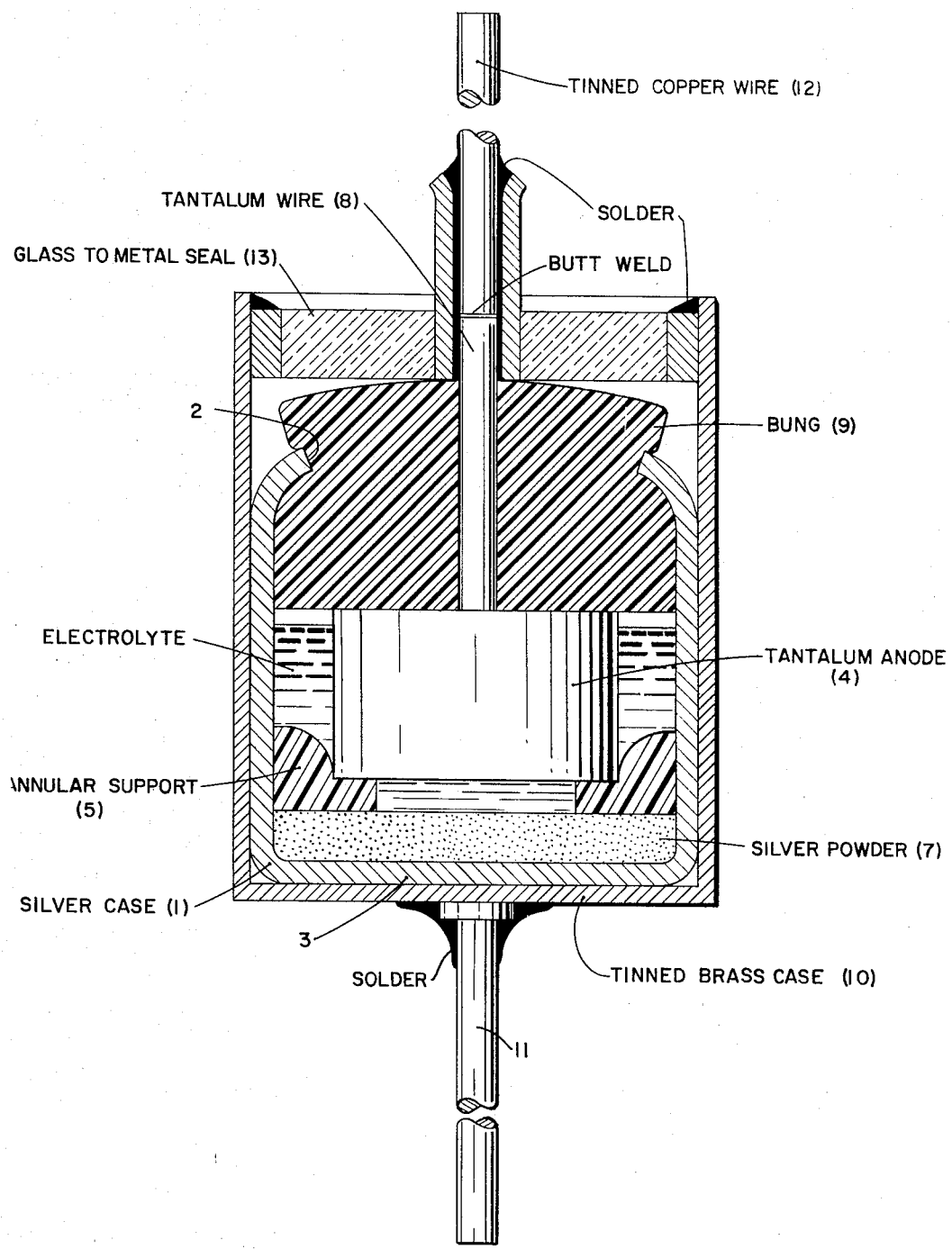

Cyril Smith, Buckingham, England, assignor to Plessey-UK Limited, Essex, England, a British company
Filed Apr. 21, 1964, Ser. No. 361,399
4 Claims. (Cl. 317—230)

This invention relates to the sealing in a fluid tight manner of small containers. In particular this invention is concerned with the sealing of capacitors which incorporate a liquid electrolyte.

It has been found that during the construction of small capacitors which utilize a liquid electrolyte one of the greatest difficulties to be overcome is the sealing of the capacitor case or can against leakage of the electrolyte. In the particular case of capacitors which utilize a sintered tantalum block as the anode a suitable electrolyte is sulphuric acid. The use of sulphuric acid is necessitated by the electrical requirements of the capacitor such as the capacitance, the temperature range within which the capacitor is desired to be operable and the power factor.

It has been found that sulphuric acid attacks many materials which would otherwise be suitable as sealing materials. Consequently in order to obtain a satisfactory sealing it is therefore necessary to use materials which are not chemically attacked by the acid. This requirement severely restricts the choice of materials inasmuch as materials which are not attacked by the acid are quite often unsuitable for use over a substantially wide temperature range such as for example $-55°$ C. to $+150°$ C. In a particular tantalum capacitor the cathode of the capacitor is formed by a silver case. The anode is located within the case and is connected to a tantalum wire which projects outwardly of the case through a seal provided to prevent the escape of the sulphuric acid electrolyte from the case. It has been found that the acid tends to leak via the seal along the inside of the silver can and/or along the tantalum wire. In the case of the electrolytic type of capacitor during the operation of the capacitor gaseous products are produced. This produces further leakage problems since many seal materials are porous to gaseous materials which can diffuse through the seal even though the seal may provide a satisfactory barrier to a liquid. In accordance with a first aspect of the present invention a case for containing a liquid is arranged to be sealed by introducing a sealing member into the mouth of the case, the case and the member sealing same then being introduced into an outer case which is intended to be hermetically sealed by sealing means impervious to gases.

In accordance with a particular aspect of the invention a first container for a liquid is sealed by introducing a sealing element into the mouth of the case so that a portion of the element protrudes from the case, the mouth of the case then being pinched inwardly to reduce the area of the case mouth thereby to press onto the element at a location intermediate of the ends thereof in such manner that a region of the element intermediate the ends thereof is subject to tension forces, the thus sealed case then being introduced into an outer casing which is hermetically sealed. Preferably the hermetic sealing is effected by a glass to metal seal.

For a better understanding of the invention reference will be made to the accompanying drawing which is a cross section of a tantalum type capacitor. The capacitor includes a silver case 1 which is of cylindrical shape having an open top 2 and a closed base 3. The anode 4 of the capacitor comprises a small cylindrical block of sintered tantalum whose outside is formed with a tantalum oxide film. The lower end of the anode block rests upon a polytetrafluoroethylene annular support 5 which itself rests upon a layer 7 of a silver powder placed at the bottom of the silver case. The space between the anode 4 and the case 1 is filled by a quantity of sulphuric acid 7. The anode 4 is connected with a projecting terminal wire 8 which is made of tantalum metal. The top of the case 1 is closed by means of a bung 9 having an axially directed bore through which the wire passes. The bung is initially cylindrical in shape and is introduced into the case 1 when the latter is cylindrical in form with a portion of the bung 9 projecting from the case 1. The mouth of the case 1 is crimped inwardly so that the case 1 assumes the shape shown in the figure. The crimping deforms the bung into the shape shown in the figure in which a portion of the bung bells outwardly from the top of the case. The crimping in the bung is conveniently effected by a press tool (not shown) which retains the bung within the case top 2 while simultaneously crimping the top inwards. In a first particular construction the bung is a cylinder 0.218" diameter by 0.10" long with a 0.020" diameter bore. In a second particular construction the bung is a cylinder 0.076" diameter by 0.125" long with a 0.016" bore. The bung 9 is considered to be in a state of tension over a region whereof intermediate of its ends. That is the material of the bung is subjected to tension forces. The tension forces are thought to be produced by the bung trying to squeeze back through the narrow annular aperture between the mouth of the top 2 of the case 1 and the wire 8 to regain its initial shape.

The thus sealed case 1 is introduced into an outer case 10 which is conveniently formed of a tinned brass, so that the two cases make good electrical contact with each other. The capacitor cathode terminal wire 11 is attached to the outer case 10.

The end of the anode wire 8 of the capacitor is connected by a butt welded joint to a tinned copper wire 12. The butt welded regions of the anode wire and the tinned copper wire are sealed to the outer casing by means of a glass to metal seal 13, which hermetically seals the outer case.

It will be appreciated that although the specific description above is concerned with a particular construction of a capacitor that the encapsulation of the capacitor in an outer case which is itself hermetically sealed preferably by a glass to metal seal is not restricted to the particular formation of the inner or outer cases. For example either or both cases can be initially open at each end and subsequently sealed by sealing arrangement such as those described above.

I claim:

1. An electrolytic capacitor assembly comprising a first electrically conductive housing with a single open end and containing an electrolyte, an insulative support disposed adjacent the bottom of said housing, a tantalum anode deposited on said insulative support with a tantalum terminal riser projecting from the anode, an insulative sealing member impervious to said electrolyte closing the open end in said first housing and having a portion projecting beyond the end thereof, said insulative sealing member having a bore extending through it with said terminal riser projecting through the bore and said sealing member being compressed-sealed therewith, an end portion of said first housing being crimped around the periphery of said sealing member and into sealing engagement with the member, a second electrically conductive housing with an open end therein enclosing the first housing and having electrical contact therewith, a first glass-to-metal seal assembly comprising a terminal support hermetically sealed therein and comprising a terminal passageway, said terminal riser extending into said passageway and being secured to said support in an hermetically sealed joint closing the passageway, and said glass-to-metal seal assembly closing the end portion of said second housing in an hermetically sealed joint extending around the periphery thereof.

2. A capacitor as recited in claim 1 wherein said first container includes a depolarizer in the bottom of said container.

3. A capacitor as recited in claim 1 comprising a tinned copper terminal projecting from the end of said terminal support thereof.

4. A capacitor as recited in claim 1 wherein the body of said second housing comprises a terminal projecting therefrom.

No references cited.

JAMES D. KALLMAN, *Primary Examiner.*